US010728903B2

(12) United States Patent
Ji et al.

(10) Patent No.: US 10,728,903 B2
(45) Date of Patent: Jul. 28, 2020

(54) APPARATUS, SYSTEMS AND METHODS FOR ADAPTIVE DOWNLINK SCHEDULING AND LINK ADAPTATION

(71) Applicant: APPLE INC., Cupertino, CA (US)

(72) Inventors: Zhu Ji, San Jose, CA (US); Yanxia Wang, Beijing (CN); Bing Zhao, Beijing (CN); Johnson O. Sebeni, Fremont, CA (US)

(73) Assignee: Apple Inc., Cupertino, CA (US)

( * ) Notice: Subject to any disclaimer, the term of this patent is extended or adjusted under 35 U.S.C. 154(b) by 28 days.

(21) Appl. No.: 15/128,264

(22) PCT Filed: Jan. 8, 2016

(86) PCT No.: PCT/CN2016/070470
§ 371 (c)(1),
(2) Date: Sep. 22, 2016

(87) PCT Pub. No.: WO2017/117797
PCT Pub. Date: Jul. 13, 2017

(65) Prior Publication Data
US 2017/0295580 A1    Oct. 12, 2017

(51) Int. Cl.
*H04W 72/08*    (2009.01)
*H04W 28/18*    (2009.01)
(Continued)

(52) U.S. Cl.
CPC .......... *H04W 72/082* (2013.01); *H04L 1/0003* (2013.01); *H04L 1/0009* (2013.01);
(Continued)

(58) Field of Classification Search
CPC .......... H04W 72/082; H04W 72/0413; H04W 72/0446; H04W 28/18; H04L 1/0003; H04L 1/0009
See application file for complete search history.

(56) References Cited

U.S. PATENT DOCUMENTS

2008/0117891 A1* 5/2008 Damnjanovic ....... H04W 72/04
370/345
2010/0322136 A1* 12/2010 Kanazawa ............ H04L 1/0026
370/312
(Continued)

FOREIGN PATENT DOCUMENTS

EP       2 434 800      3/2012
WO    2012/061976     5/2012
(Continued)

*Primary Examiner* — Feben Haile
(74) *Attorney, Agent, or Firm* — Fay Kaplun & Marcin, LLP (57) ABSTRACT

Described herein are apparatuses, systems and methods for adaptive downlink scheduling and link adaptation. The methods including, at a base station connected to a user equipment ("UE"), determining an initial modulation and coding scheme ("MCS") for a plurality of subframes to be transmitted to the UE, wherein each MCS relates to a coding rate value for the subframes, determining an MCS pattern for the plurality of subframes based on the initial MCS, wherein an MCS for one of the subframes has a higher coding rate value than the initial MCS, and transmitting the plurality of subframes to the UE according to the MCS pattern.

20 Claims, 7 Drawing Sheets

(51) Int. Cl.
*H04L 5/00* (2006.01)
*H04L 1/00* (2006.01)
*H04W 72/04* (2009.01)

(52) U.S. Cl.
CPC ............ *H04L 5/001* (2013.01); *H04W 28/18* (2013.01); *H04W 72/0413* (2013.01); *H04W 72/0446* (2013.01)

(56) References Cited

U.S. PATENT DOCUMENTS

| | | | |
|---|---|---|---|
| 2014/0126467 A1 | 5/2014 | Lu et al. | |
| 2014/0179332 A1 | 6/2014 | Qian et al. | |
| 2015/0207609 A1* | 7/2015 | Nam | H04L 1/0031 370/329 |
| 2016/0135194 A1* | 5/2016 | Kim | H04B 7/0626 370/329 |
| 2019/0182816 A1* | 6/2019 | Choe | H04W 72/046 |

FOREIGN PATENT DOCUMENTS

| | | | | |
|---|---|---|---|---|
| WO | 2013/143069 | 10/2013 | | |
| WO | WO-2015077964 A1 * | 6/2015 | ........... | H04L 1/1819 |

* cited by examiner

Table 400

Table 10.1.3.2-6: Transmission of HARQ-ACK multiplexing for M = 4

| Primary Cell | Secondary Cell | Resource $n^{(1)}_{PUCCH}$ | Constellation $b(0), b(1)$ | RM Code Input Bits $o(0), o(1), o(2), o(3)$ |
|---|---|---|---|---|
| HARQ-ACK(0), HARQ-ACK(1), HARQ-ACK(2), HARQ-ACK(3) | HARQ-ACK(0), HARQ-ACK(1), HARQ-ACK(2), HARQ-ACK(3) | | | |
| ACK, ACK, ACK, NACK/DTX | ACK, ACK, ACK, NACK/DTX | $n^{(1)}_{PUCCH,1}$ | 1, 1 | 1, 1, 1, 1 |
| ACK, ACK, NACK/DTX, any | ACK, ACK, ACK, NACK/DTX | $n^{(1)}_{PUCCH,1}$ | 0, 0 | 1, 0, 1, 1 |
| ACK, DTX, DTX, DTX | ACK, ACK, ACK, NACK/DTX | $n^{(1)}_{PUCCH,3}$ | 1, 1 | 0, 1, 1, 1 |
| ACK, ACK, ACK, ACK | ACK, ACK, ACK, NACK/DTX | $n^{(1)}_{PUCCH,3}$ | 1, 1 | 0, 1, 1, 1 |
| NACK/DTX, any, any, any | ACK, ACK, ACK, NACK/DTX | $n^{(1)}_{PUCCH,3}$ | 0, 1 | 0, 0, 1, 1 |
| (ACK, NACK/DTX, any, any), except for (ACK, DTX, DTX, DTX) | ACK, ACK, ACK, NACK/DTX | $n^{(1)}_{PUCCH,3}$ | 0, 1 | 0, 0, 1, 1 |
| ACK, ACK, ACK, NACK/DTX | ACK, ACK, NACK/DTX, any | $n^{(1)}_{PUCCH,0}$ | 1, 0 | 1, 1, 1, 0 |
| ACK, ACK, NACK/DTX, any | ACK, ACK, NACK/DTX, any | $n^{(1)}_{PUCCH,3}$ | 1, 0 | 1, 0, 1, 0 |
| ACK, DTX, DTX, DTX | ACK, ACK, NACK/DTX, any | $n^{(1)}_{PUCCH,0}$ | 0, 1 | 0, 1, 1, 0 |
| ACK, ACK, ACK, ACK | ACK, ACK, NACK/DTX, any | $n^{(1)}_{PUCCH,0}$ | 0, 1 | 0, 1, 1, 0 |
| NACK/DTX, any, any, any | ACK, ACK, NACK/DTX, any | $n^{(1)}_{PUCCH,3}$ | 0, 0 | 0, 0, 1, 0 |
| (ACK, NACK/DTX, any, any), except for (ACK, DTX, DTX, DTX) | ACK, ACK, NACK/DTX, any | $n^{(1)}_{PUCCH,3}$ | 0, 0 | 0, 0, 1, 0 |
| ACK, ACK, ACK, NACK/DTX | ACK, DTX, DTX, DTX | $n^{(1)}_{PUCCH,2}$ | 1, 1 | 1, 1, 0, 1 |
| ACK, ACK, ACK, NACK/DTX | ACK, ACK, ACK, ACK | $n^{(1)}_{PUCCH,2}$ | 1, 1 | 1, 1, 0, 1 |
| ACK, ACK, NACK/DTX, any | ACK, DTX, DTX, DTX | $n^{(1)}_{PUCCH,2}$ | 0, 1 | 1, 0, 0, 1 |
| ACK, ACK, NACK/DTX, any | ACK, ACK, ACK, ACK | $n^{(1)}_{PUCCH,2}$ | 0, 1 | 1, 0, 0, 1 |
| ACK, DTX, DTX, DTX | ACK, DTX, DTX, DTX | $n^{(1)}_{PUCCH,2}$ | 1, 0 | 0, 1, 0, 1 |
| ACK, DTX, DTX, DTX | ACK, ACK, ACK, ACK | $n^{(1)}_{PUCCH,2}$ | 1, 0 | 0, 1, 0, 1 |
| ACK, ACK, ACK, | ACK, DTX, DTX, DTX | $n^{(1)}_{PUCCH,2}$ | 1, 0 | 0, 1, 0, 1 |
| ACK, ACK, ACK, ACK | ACK, ACK, ACK, ACK | $n^{(1)}_{PUCCH,2}$ | 1, 0 | 0, 1, 0, 1 |
| NACK/DTX, any, any, any | ACK, DTX, DTX, DTX | $n^{(1)}_{PUCCH,2}$ | 0, 0 | 0, 0, 0, 1 |
| NACK/DTX, any, any, any | ACK, ACK, ACK, ACK | $n^{(1)}_{PUCCH,2}$ | 0, 0 | 0, 0, 0, 1 |
| (ACK, NACK/DTX, any, any), except for (ACK, DTX, DTX, DTX) | ACK, DTX, DTX, DTX | $n^{(1)}_{PUCCH,2}$ | 0, 0 | 0, 0, 0, 1 |

APPARATUS, SYSTEMS AND METHODS FOR ADAPTIVE DOWNLINK SCHEDULING AND LINK ADAPTATION

BACKGROUND

In wireless telecommunication networks, Long-Term Evolution, or "LTE," is defined as a standard for wireless communication of high-speed data for mobile phones and data terminals. The LTE standard is developed by the Third Generation Partnership Project ("3GPP") and the Institute of Electrical and Electronics Engineers ("IEEE"). An exemplary LTE access network is a wireless network of base stations, or evolved NodeBs ("eNBs"), that are interconnected without a centralized intelligent controller.

Long-term evolution ("LTE") is a wireless communication standard used for high-speed data for mobile devices and data terminals. LTE-Advanced is a major enhancement to the LTE standard. Within the LTE-Advanced standard, carrier aggregation is used to increase the bandwidth, and thereby increase the bitrates. Carrier aggregation has been introduced in the 3rd Generation Partnership Project ("3GPP") Release 10 (LTE-Advanced standard) to provide wider than 20 MHz transmission bandwidth to a single device (e.g., user equipment or "UE") while maintaining the backward compatibility with legacy UEs. Specifically, carrier aggregation may be defined as the aggregation of two or more component carriers in order to support wider transmission bandwidths. Carrier aggregation configuration may be defined as a combination of carrier aggregation operating bands, each supporting a carrier aggregation bandwidth class by a UE. The bandwidth class may be defined by the aggregated transmission bandwidth configuration and maximum number of component carriers supported by a UE.

For intra-band contiguous carrier aggregation, a carrier configuration may be a single operating band supporting a carrier aggregation bandwidth class. For each carrier aggregation configuration, requirements may be specified for all bandwidth combinations contained within a bandwidth combination set, as indicated by the radio access capabilities of the UE. Accordingly, a UE may indicate support of several bandwidth combination sets for each band combination.

Figure 1:
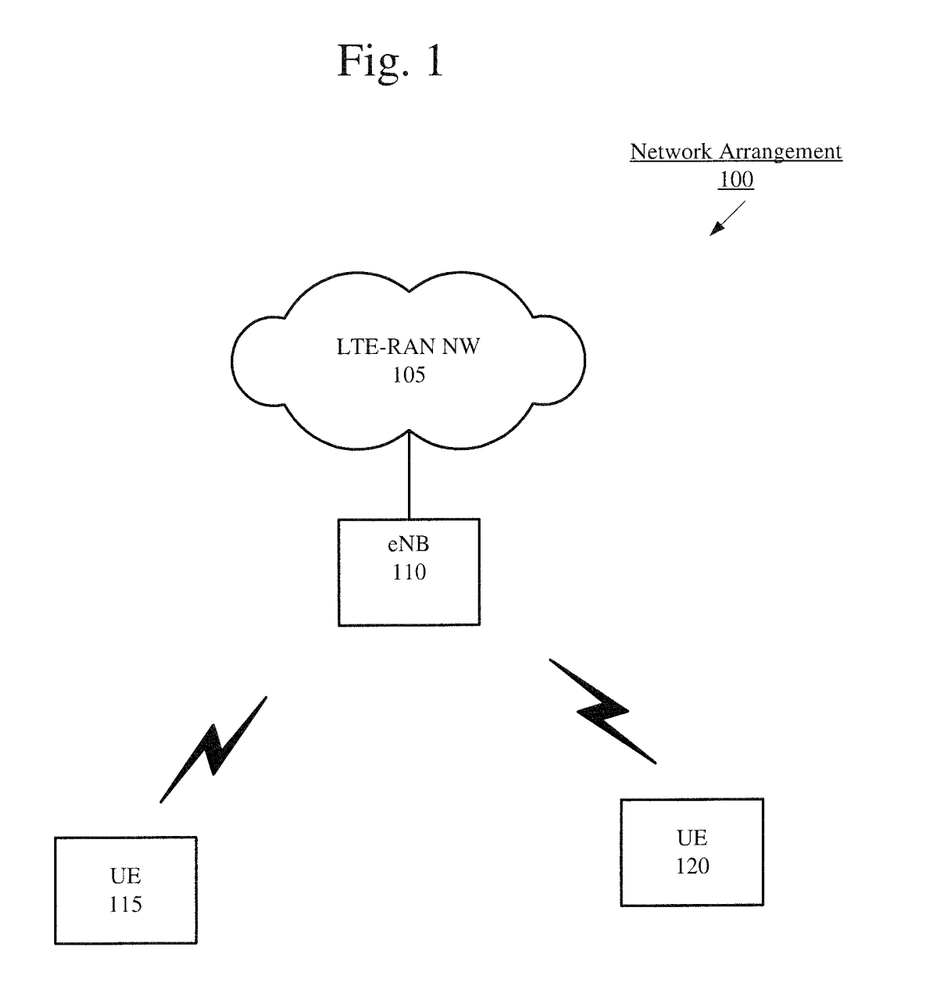
FIG. 1 shows an exemplary network arrangement 100 according to various embodiments described herein.

Under the current standards, each aggregated carrier is referred to as a component carrier, and each component carrier can have a bandwidth of 1.4, 3, 5, 10, 15 or 20 MHz and a maximum of five component carriers can be aggregated. As illustrated in FIG. 1, two exemplary component carriers may each have a bandwidth of 10 MHz to combine for a total bandwidth of 20 MHz. With carrier aggregation ("CA") features enabled, the LTE-Advanced standard device supporting 20 MHz carrier aggregation may achieve downlink throughput of 100 Mbps.

In the frequency division duplex ("FDD") CA case, the number of aggregated carriers can be different in the downlink ("DL") and the uplink ("UL"). However, the number of UL component carriers is always equal to or lower than the number of DL component carriers. The individual component carriers can also be of different bandwidths. For time division duplex ("TDD") CA case, the number of component carriers, as well as the bandwidths of each component carrier, will normally be the same for DL and UL.

SUMMARY

Described herein are apparatuses, systems and methods for adaptive downlink scheduling and link adaptation. The methods including, at a base station connected to a UE, determining an initial modulation and coding scheme ("MCS") for a plurality of subframes to be transmitted to the UE, wherein each MCS relates to a coding rate value for the subframes, determining an MCS pattern for the plurality of subframes based on the initial MCS, wherein an MCS for one of the subframes has a higher coding rate value than the initial MCS, and transmitting the plurality of subframes to the UE according to the MCS pattern.

Further described herein is an eNB comprising a transceiver configured to enable the eNB to establish a connected to a UE within an LTE network, and a processor configured to determine an initial MCS for a plurality of subframes to be transmitted to the UE, wherein each MCS relates to a coding rate value for the subframes, determine an MCS pattern for the plurality of subframes based on the initial MCS, wherein an MCS for one of the subframes has a higher coding rate value than the initial MCS, and transmit the plurality of subframes to the UE according to the MCS pattern.

Further described herein is an eNB comprising a transceiver configured to establish a connection to a UE using an outer loop link adaptation ("OLLA") and an inner link adaptation loop, and a processor configured to receive and decode a physical uplink control channel ("PUCCH") message from UE, identify a status indication from the PUCCH message, when the status indication identifies a designation of a first feedback type, set an update rate of the OLLA to a first value, wherein the first value is less than a maximum update rate of the OLLA, and when the status indication identifies a designation of second feedback type, set an update rate of the OLLA to a second value, wherein the second value is less than a maximum update rate of the OLLA.

Further described herein is a method comprising, at a base station connected to a UE using an OLLA and an inner link adaptation loop, receiving and decoding a PUCCH message from UE, identifying a status indication from the PUCCH message, when the status indication identifies a designation of a first feedback type, setting an update rate of the OLLA to a first value, wherein the first value is less than a maximum update rate of the OLLA, and when the status indication identifies a designation of second feedback type, setting an update rate of the OLLA to a second value, wherein the second value is less than a maximum update rate of the OLLA.

BRIEF DESCRIPTION OF THE DRAWINGS

FIG. 4 shows a table for transmission of HARQ-ACK multiplexing, wherein there are four bits (M).

DETAILED DESCRIPTION

The exemplary embodiments may be further understood with reference to the following description and the appended drawings, wherein like elements are referred to with the same reference numerals. The exemplary embodiments describe an apparatus, system and method for adaptive downlink scheduling and link adaptation. Furthermore, exemplary embodiments also describe adaptive link adaptation for outer loop in carrier aggregation scenarios. Within these exemplary embodiments, a mobile device will be described as user equipment ("UE") and the base station will be described as an evolved Node B ("eNB") base station, which is generally known as being a base station associated with a Long-Term Evolution ("LTE") radio access network ("LTE-RAN"). However, it will be understood by those skilled in the art that UEs and base stations operating in accordance with other network standards may also implement the exemplary embodiments in accordance with the functionalities and principles described herein.

The LTE-RAN may be a portion of the cellular networks deployed by cellular providers or operators (e.g., Verizon, AT&T, Sprint, T-Mobile, etc.). These networks may include, for example, base client stations (Node Bs, eNodeBs, HeNBs, etc.) that are configured to send and receive traffic from UEs that are equipped with an appropriate cellular chip set. In addition to LTE-RAN, the operators may also include legacy RANs that are generally labeled as 2G and/or 3G networks and may utilize circuit switched voice calls and packet switched data operations. Those skilled in the art will understand that the cellular providers may also deploy other types of networks, including further evolutions of the cellular standards, within their cellular networks.

FIG. 1 shows an exemplary network arrangement 100 according to various embodiments described herein. The exemplary network arrangement 100 is illustrated as including UEs 115, 120. In this example, it is assumed that a respective, different user is using each of the UEs 115, 120. For example, a first user may be utilizing the UE 115 while a second user may be utilizing the UE 120. Those skilled in the art will understand that the UEs 115, 120 may be any type of electronic component that is configured to communicate via a network, e.g., mobile phones, tablet computers, desktop computers, smartphones, phablets, embedded devices, wearables, etc. It should also be understood that an actual network arrangement may include any number of UEs being used by any number of users and being associated with any number of these users where the user may be associated with one or more of the UEs. That is, the example of two UEs 115, 120 is only provided for illustrative purposes.

Each of the UEs 115, 120 may be configured to communicate with one or more networks. According to the exemplary embodiments, the UEs 115, 120 may communicate with a LTE radio access network (LTE-RAN) 105. Specifically, the UEs 115, 120 may connect to the LTE-RAN 105 via an base station (which may be an access point) such as an evolved Node B (eNB) 110. The LTE-RAN 105 may be a cellular network that may be deployed by a cellular provider (e.g., Verizon, AT&T, Sprint, T-Mobile, etc.). The LTE-RAN 105 may include, for example, base stations such as the eNB 110 (or other types such as Node Bs, HeNBs, etc.) that are configured to send and receive traffic from UEs that are equipped with the appropriate LTE cellular chip set. Those skilled in the art will understand that the cellular providers may also deploy other types of networks, including further evolutions of the cellular standards, within their cellular networks.

More specifically, the eNB 110 may include one or more antenna groups which are configured to exchange data with the UEs 115, 120. The data may be exchanged in communications where data transmitted from the eNB 110 to the UEs 115, 120 comprise a downlink or forward link and data transmitted from the UEs 115, 120 to the eNB 110 comprise an uplink or reverse link. Based upon the type of LTE-RAN 105, the communication links under a frequency division duplex (FDD) system may use different frequencies for communications, particularly between the UE 115 and the UE 120 while communication links under a time division duplex (TDD) system may use a common frequency but at differing times. It should be noted that the communication between the UEs 115, 120 and the LTE-RAN 105 via the eNB 110 may include further parameters such as an operating area of the eNB 110 and diversity techniques (e.g., spatial multiplexing, spatial diversity, pattern diversity, etc.). The exemplary embodiments may utilize any of these properties of the LTE-RAN 105.

Figure 2:
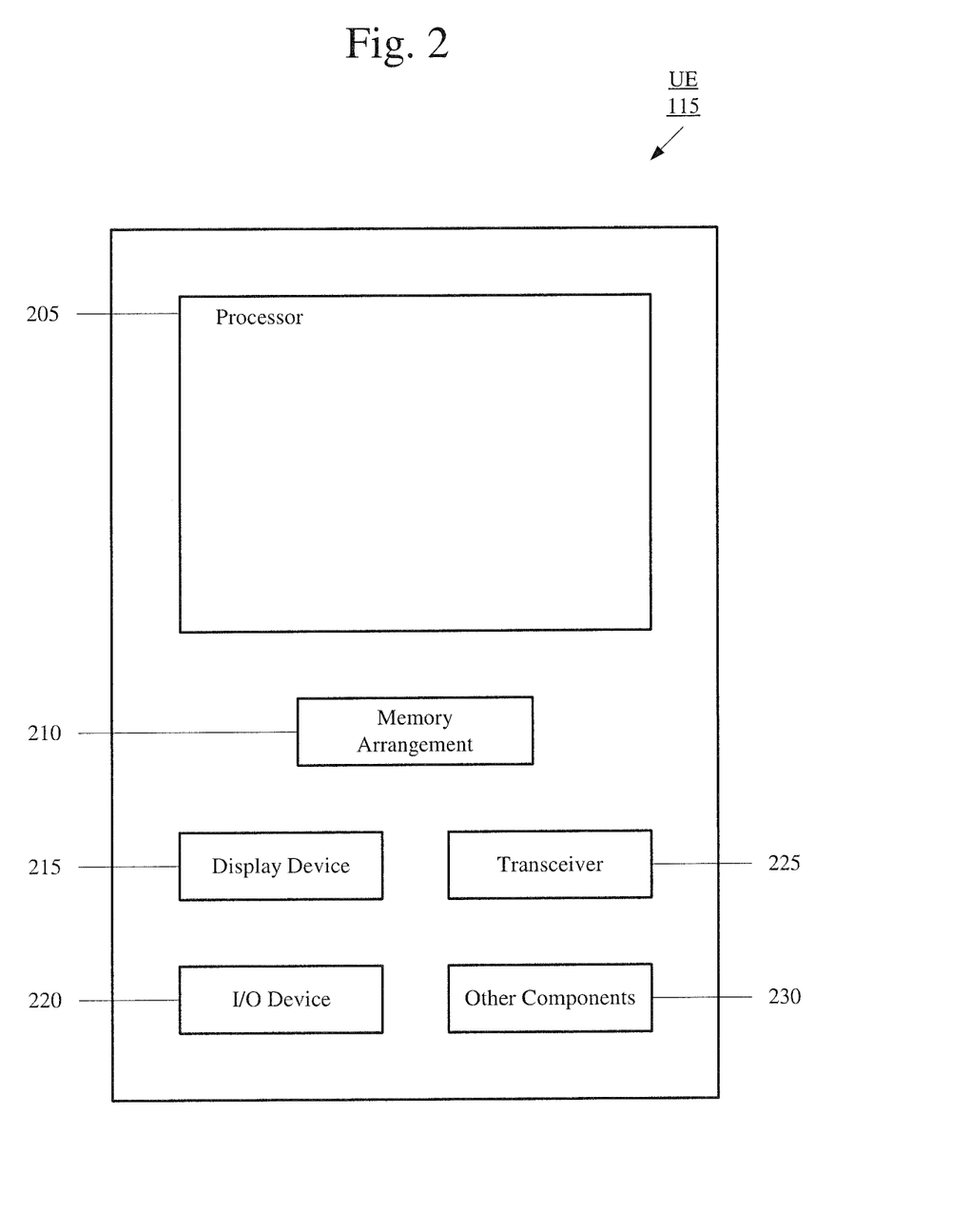
FIG. 2 shows the UE configured to establish a connection with the eNB of the LTE-RAN according to various embodiments described herein.

FIG. 2 shows the UE 115 configured to establish a connection with the eNB 110 of the LTE-RAN 105 according to various embodiments described herein. Initially, it is noted that the description below relates to the UE 115. However, the description for the UE 115 may also apply to the UE 120. The UE 115 may include a processor 205, a memory arrangement 210, a display device 215, an input/output (I/O) device 220, a transceiver 225, and other components 230. The other components 230 may include, for example, an audio input device, an audio output device, a battery, a data acquisition device, ports to electrically connect the UE 115 to other electronic devices, etc.

The processor 205 may be configured to execute a plurality of applications of the UE 115. It should be noted that the processor 205 may include an application processor and a baseband processor. For example, the application processor may be utilized for a plurality of applications executed on the UE 115 such as the web browser. In another example, the baseband processor may be utilized for operations associated with the LTE-RAN 105 and the connection thereto. The above noted applications each being an application (e.g., a program) executed by the processor 205 are only exemplary. The functionality associated with the applications may also be represented as a separate incorporated component of the UE 115 or may be a modular component coupled to the UE 115, e.g., an integrated circuit with or without firmware.

The memory 210 may be a hardware component configured to store data related to operations performed by the UE 115. The display device 215 may be a hardware component configured to show data to a user while the I/O device 220 may be a hardware component that enables the user to enter inputs. It should be noted that the display device 215 and the I/O device 220 may be separate components or integrated together such as a touchscreen. The transceiver 225 may be a hardware component configured to transmit and/or receive data. That is, the transceiver 225 may enable communication with the LTE-RAN 105. The transceiver 225 may operate on a variety of different frequencies or channels (e.g., set of consecutive frequencies) that are related to the LTE-RAN 105. Thus, an antenna (not shown) coupled with the transceiver 225 may enable the transceiver 225 to operate on the LTE frequency band. For example, the UE 115 may perform uplink and/or downlink communication functionalities via the transceiver 225 with the LTE-RAN 105.

Figure 3:
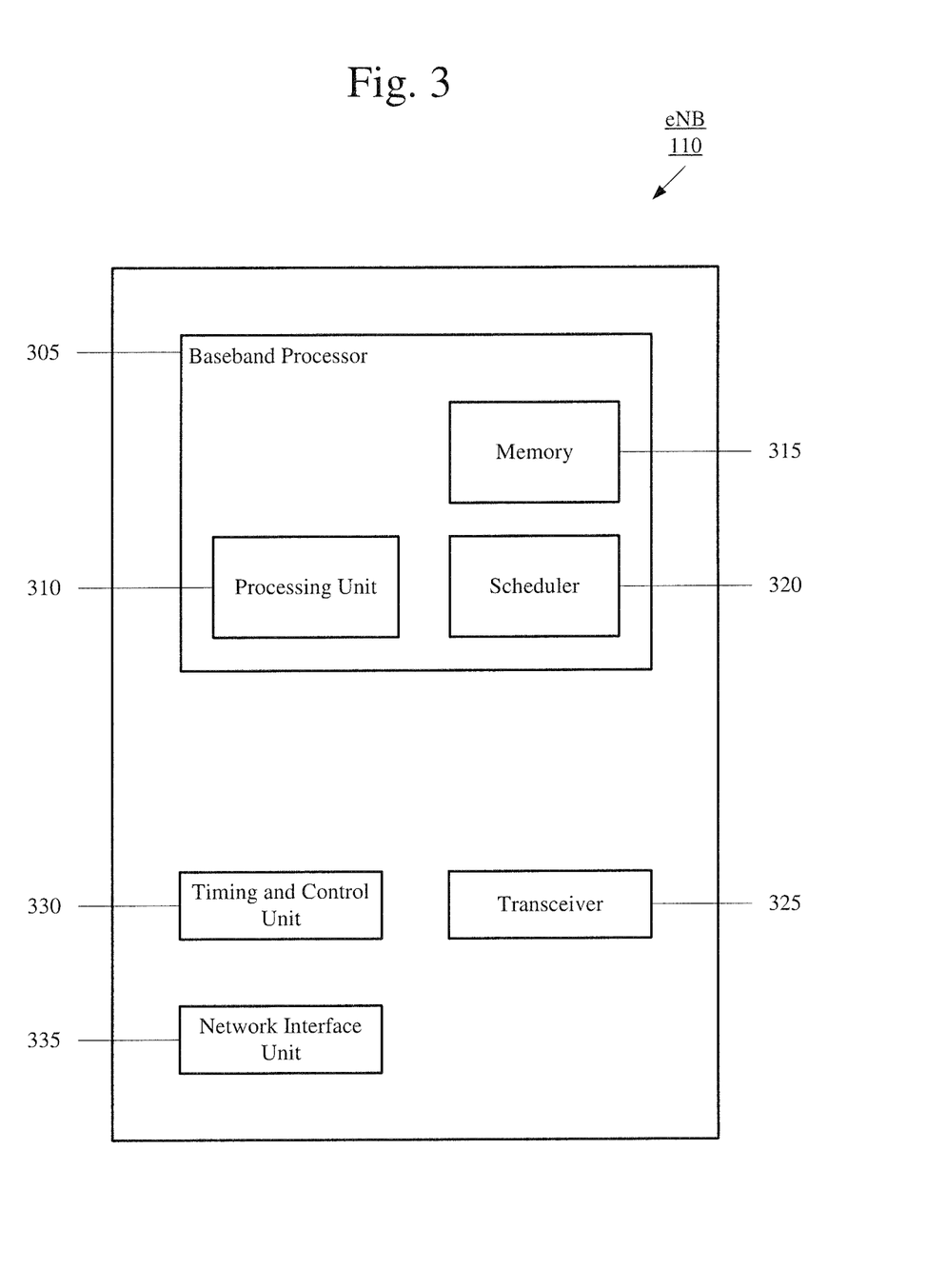
FIG. 3 shows the eNB of the LTE-RAN configured to establish a connection with the UEs according to various embodiments described herein.

FIG. 3 shows the eNB 110 of the LTE-RAN 105 configured to establish a connection with the UEs 115, 120 according to various embodiments described herein. As discussed above, the eNB 110 may be any access point or base station of the LTE-RAN 105 that enables the UEs 115, 120 to establish a connection to the LTE-RAN 105. The eNB 110 may be one of a plurality of base stations deployed for the LTE-RAN 105. The eNB 110 may provide a portion of the operating area of the LTE-RAN 105. The eNB 110 may include a baseband processor 305, a transceiver 325, a timing and control unit 330, and a network interface unit 335.

The baseband processor 305 may provide a radio communication with the UEs 115, 120 via the transceiver 325, which may be coupled to an antenna (not shown). The transceiver 325 may be substantially similar to the transceiver 225 of the UE 115 such as operating on a predetermined frequency or channel of the LTE-RAN 105. It should be noted that the transceiver 225 may include a separate transmitter and receiver or a combined unit that performs the functionalities of the transmitter and receiver. The baseband processor 305 may be configured to operate according to a wireless communications standard based upon the LTE-RAN 105 (e.g., a 3GPP LTE). The baseband processor 305 may include a processing unit 310 to process relevant information for the eNB 110. The baseband processor 305 may also provide additional baseband signal processing operations as may be utilized such as a UE registration, a channel signal information transmission, a radio resource management, a connected discontinuous reception ("C-DRX") functionality, etc. The baseband processor 305 may also include a memory arrangement 310 that is in communication with the processing unit 310 to store the relevant information including the various signal processing operations for the eNB 110. The baseband processor 305 may further include a scheduler 320 which may provide scheduling decisions for the UEs 115, 120 serviced by the eNB 110.

The timing and control unit 330 may monitor operations of the baseband processor 305. The timing and control unit 330 may also monitor the operations of the network interface unit 335. The timing and control unit 330 may accordingly provide appropriate timing and control signals to these units. The network interface unit 335 may provide a bi-directional interface for the eNB 110 to communicate with other network components of the LTE-RAN 105 such as a core network or a back-end network. This may enable a facilitation of administrative and call-management functionalities for the UEs 115, 120 operating in the LTE-RAN 105 through the eNB 110.

The exemplary embodiments provide a mechanism for performing a channel state feedback ("CSF") operation. The CSF operation may be used in generating a report for the eNB 110 to manage the connection between the UE 115 and the eNB 110. The CSF operation may be associated with a link adaptation operation, particularly of an inner loop. Specifically, the mechanism of the exemplary embodiments set a block error rate ("BLER") target value to be used in the CSF operation.

The link adaptation functionality may be a wireless communication that denotes a matching of modulation, coding, and other signal and protocol parameters to a radio link such as the connection between the UE 115 and the eNB 110. For example, the denoting may be to a path loss, an interference such as from signals from other UEs, a sensitivity of a receiver, an available transmitter power margin, etc. The link adaptation functionality may also be referred to as an adaptive modulation and coding ("AMC") functionality. Those skilled in the art will understand that the link adaptation functionality may be used with a rate adaptation functionality in adapting a modulation and coding scheme ("MCS"). This adaptation may be with respect to a quality of the radio channel in which the connection is established between the UE 115 and the eNB 110. Therefore, the bit rate and robustness of a data transmission may be managed where the process of the link adaptation functionality is dynamic to change the signal and protocol parameters as the radio link conditions change.

An adaptive modulation system uses connection-related information, such as channel state information, at the transmitter of the UE 115. Accordingly, connection parameters and metrics may be determined and utilized for this purpose. That is, connection-related information may include the connection parameters and metrics that are determined or calculated such as a channel estimation, a received signal strength, etc. Those skilled in the art will understand that the connection-related information may be determined based upon packets or signals received from the eNB 110 such as pilot signals. For example, in a TDD system, the channel from the transmitter to the receiver may be assumed to be approximately the same as the channel from the receiver to the transmitter. In another example, the information of the channel may be directly measured at the receiver and used with the transmitter. Through this mechanism of the adaptive modulation system, a rate of transmission and/or bit error rates may be improved through exploiting the channel state information that is determined at the transmitter of the UE 115.

When carrier aggregation is used with the exemplary UE 115, there may be a number of serving cells for each of the component carriers. The coverage of the serving cells may differ due to both component carrier frequencies and power planning, which is useful for heterogeneous network planning. A radio resource control ("RRC") connection is handled by one cell, namely the primary serving cell ("PCell"), served by the primary component carrier ("PCC") for uplink ("UL") and downlink ("DL").

The other component carriers may be referred to as secondary component carrier ("SCCs") for UL and DL, serving the secondary serving cells ("SCells"). The SCCs are added and removed as required, while the PCC is changed at handover. Those skilled in the art will understand that the PCell and SCells are logical constructs allowing for the addition of SCells as needed. The PCell is the main cell that is used for all RRC signaling and control procedures, while the SCell is considered an augmentation to the PCell.

Within a TDD carrier aggregation, a typical scenario includes more than one configured serving cell with a physical uplink control channel ("PUCCH") in format 1b with channel selection in order to carry to uplink control information. The PUCCH may be a stand-alone uplink physical channel, wherein the PUCCH control signaling channel may comprises hybrid automatic repeat request ("HARQ") acknowledgments and negative acknowledgments ("ACK/NACK"), discontinuous transmissions ("DTX"), channel quality indicators ("CQIs"), rank indicators ("RIs"), precoding matrix indicators ("PMIs"), scheduling requests for uplink transmission, BPSK or QPSK used for PUCCH modulation, etc.

During a TDD CA scenario, more than 4 HARQ-ACK bits for multiple DL subframes may be associated with a single UL subframe (n). For the configuring serving cells, spatial HARQ-ACK bundling may be performed across multiple codewords within a DL subframe for all configured cells. Furthermore, the bundled HARQ-ACK bits for each configured serving cell may be transmitted using the above-mentioned PUCCH format 1b with channel selection. Accordingly, payload b(0), b(1) sent on different PUCCH resources may be mapped to different ACK/NACK status for associated subframes. In addition, the same payload sent on the same PUCCH resource may be mapped to different interpretations of ACK/NACK status. This mapping to different interpretations may be referred to as ambiguity.

In a multiplexed set, if there is a NACK, the error may be propagated to other subframes due to this ambiguity. For instance, an exemplary eNB may not have the exact ACK/NACK/DTX information decoded. Therefore, the eNB may consider the feedback to be classified as DTX. If the actual decoded result of DL receptions at the UE 115 is ACK, the eNB would still retransmit these subframes due to the ambiguity. If the actual feedback is NACK, the eNB does not adjust the current MCS to a lower MCS, also due to the ambiguity.

FIG. 4 shows a table 400 for transmission of HARQ-ACK multiplexing, wherein there are four (4) bits (M). As depicted in the table 400, there are entries for the Pcell (e.g., HARQ-ACK(0), HARQ-ACK(1), HARQ-ACK(2), HARQ-ACK(3)) the SCell (e.g., HARQ-ACK(0), HARQ-ACK(1), HARQ-ACK(2), HARQ-ACK(3)), the resource (e.g., PUCCH indicator), the constellation (e.g., b(0), b(1)), and RM code input bits (e.g., o(0), o(1), o(2), o(3)). It should be noted that the first subframe having the ACK/NACK result is significant due to the fact that if the first result is NACK/DTX, then all subsequent feedback is "any" and the eNB considers such feedback as DTX. Furthermore, it should be noted that while FIG. 4 discusses the use of four bits (e.g., M=4), this is only an example of one embodiment, as any number of bits may be utilized (e.g., M=3, M=2, etc.). For instance, the further embodiments may be applied to alternative scenarios, such as transmission of HARQ-ACK multiplexing for M=3, where there may be ambiguity in UL report of ACK/NAK information of DL reception. Accordingly, the systems and methods described herein are not limited to the four bit, M=4, scenario depicted in table 400 of FIG. 4.

According to the exemplary embodiments of the systems and methods described herein, different MCSs may be used for different subframes. Specifically, each previous subframe may have a lower MCS than the next subframe. The purpose of this arrangement is to ensure that the previous subframe is decoded successfully and to prevent the subsequent frames from being deemed as ambiguous.

When the exemplary UE 115 uses PUCCH format 1b with channel selection for the ACK/NACK feedback, table 400 illustrates that there are many items with the feedback bit set to "any." In such a case, the exemplary eNB 110 cannot identify the real value. Thus, the eNB 110 would then consider all of these "any" bits to be DTX and therefore would retransmit the subframes again. If the UE 115 decodes these subframes correctly, but the eNB 110 retransmits the subframes because the eNB 110 could not identify the real value, this scenario will lead to wasted radio resources. On the other hand, if the UE 115 did not decode these subframes correctly, then it would be appropriate for the eNB 110 to retransmit the subframes. However, the problem is that the eNB 110 will not adjust the MCS while performing the outer loop link adaptation since the eNB 110 does not consider the feedback as a NACK, but rather just as ambiguous feedback. As a result, the performance will diminish since the eNB 110 will experience a much higher BLER when compared with non-carrier aggregation. The adaptive link adaptation for the outer loop will be described in greater detail below.

Figure 5:
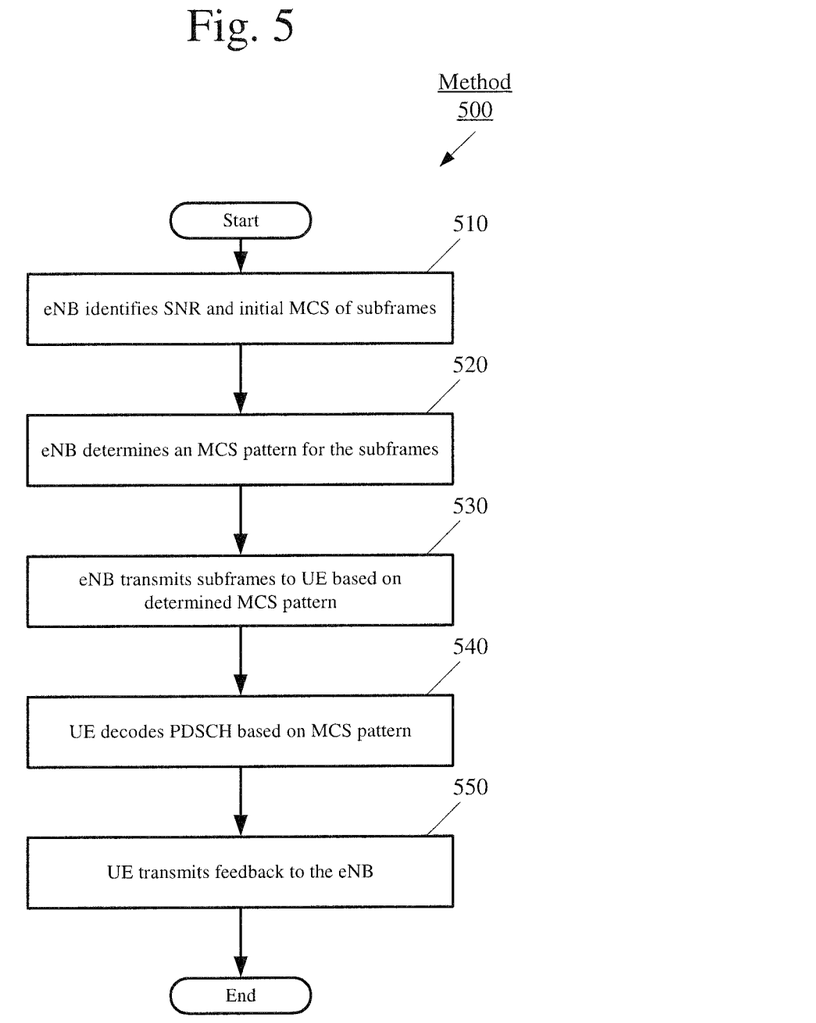
FIG. 5 shows an exemplary method for adaptive per subframe DL scheduling at a mobile device, such as the UE, in a wireless network, such as the LTE-RAN, according to various embodiments described herein.

FIG. 5 shows an exemplary method 500 for adaptive per subframe DL scheduling at a mobile device, such as the UE 110, in a wireless network, such as the LTE-RAN 105, according to various embodiments described herein. The method 500 will be described with reference to the network arrangement 100 of FIG. 1. The exemplary embodiments show systems and methods for carrier channel selection (e.g., PCC and SCC) in TDD carrier aggregation enabled networks.

The exemplary method 500 described herein may enhance the performance of the eNB 110 by allowing the eNB 110 to allocate different MCS for different subframes in a multiplexed ACK/NACK reporting set. Specifically, the first subframe may be allocated with the lowest MCS and the last subframe may be allocated with the highest MCS. This is due to the fact that the first subframe is more significant considering the possible propagation effect of the first subframe.

In 510, the eNB 110 determines the signal-to-noise ratio ("SNR") at the UE 115 and the initial MCS of the subframes. For instance, the eNB 110 may determine that the SNR is 10 dB and the initial MCS is 16 for 4 scheduled subframes. Thus, in this example, the eNB 110 determines that the SNR having a value of 10 dB means that the coding value for the MCS should be 16.

In 520, the eNB 110 determines an MCS pattern for each of the subframes. For instance, in the four-subframe example, Subframe 1 may have a MCS of 14, Subframe 2 may have a MCS of 15, Subframe 3 may have a MCS of 16 and Subframe 4 may have a MCS of 17. Those skilled in the art would understand that the MCS may be used to determine the coding rate, wherein the higher the MCS equates to a higher coding rate (e.g., a lower numerical MCS value is a more robust coding rate). In 530, the eNB 110 then transmits the subframes to the UE 115 based on the MCS pattern determined in 520.

In 540, the UE 115 may decode the physical downlink shared channel ("PDSCH") based on the MCS pattern determined by the eNB 110. According to the example above, with the MCS of 16 at an SNR of 10, it is likely the UE 115 will decode the PDSCH correctly. Furthermore, when the MCS of the subframes is lower than the initial MCS (e.g., with MCS 14 and 15), the UE 115 may be assured of decoding these subframes correctly. The only possible incorrect decoding may be within subframes having a higher MCS, such as Subframe 4 with MCS 17.

In 550, the UE 115 transmits the feedback to the eNB 110. The exemplary per subframe DL scheduling limits the number of retransmissions of subframes by the eNB 110 to those having a higher numeric MCS value than that of the initial MCS. In other words, using the MCS pattern of 520, the eNB 110 may only have the possibility to retransmit Subframe 4 since the MCS 17 of Subframe 4 is higher than the initial MCS of 16. That it, the eNB 110 is assured that the first three subframes have been decoded correctly because the MCS is at least as robust as required for the SNR being experienced on the channel. Accordingly, the eNB 110 and the network 105 can save more resources without the need for unnecessary retransmission due to multiplexing in TDD carrier aggregation scenarios. Furthermore, the eNB 110 may have more accurate knowledge of which subframe was, in fact, the cause of the ACK transmission. This more accurate knowledge of the ACK/NACK information from the UE 115 may be used by the eNB 110 to update the link adaptation outer loop according to an outer loop link adaptation update rate.

Figure 6:
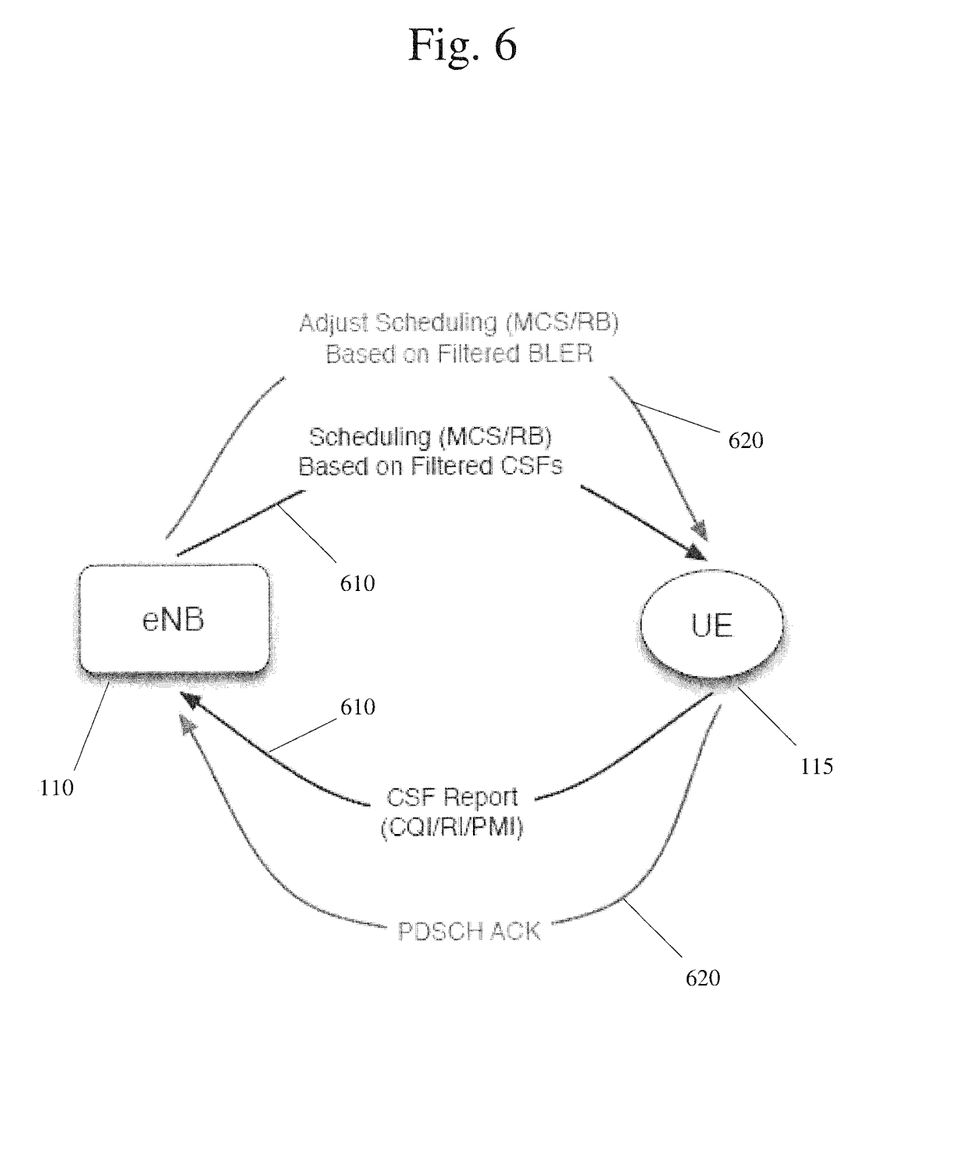
FIG. 6 shows an exemplary system including the UE in communication with the eNB using link adaptation loops according to various embodiments described herein.

FIG. 6 shows an exemplary system 600 including the UE 115 in communication with the eNB 110 using link adaptation loops according to various embodiments described herein. The system 600 will be described with reference to the network arrangement 100 of FIG. 1. As depicted in FIG. 6, the system 600 may include an inner loop 610 and an outer loop 620 that may be the representative components of the link adaptation functionality between the eNB 110 and the UE 115.

The inner loop 610 may be used by the UE 115 for providing the eNB 110 with a channel state feedback ("CSF") report. The CSF report may include information such as CQI, RI, PMI, etc. Specifically, the UE 115 may perform CSF estimation based on the channel estimation on the DL pilot signals and report back to the eNB 110. Accordingly, the inner loop 610 may also be used by the eNB 110 for scheduling MCS/RB based on filtered CSF. Specifically, the eNB 110 may schedule DL grants with corresponding MCSs, number of resource blocks ("RBs"), and multiple-input, multiple-output ("MIMO") types. According to an exemplary embodiment, the CSF (e.g., CQI/PMI/RI) estimation may be targeted to achieve less than 10% BLER for additive white Gaussian noise ("AWGN") channels.

The outer loop 620 may include a BLER target to be maintained by the eNB 110. The BLER target may vary for different channel scenarios such as being Doppler dependent. The channel state feedback operation may have an estimation at the UE 115 that is not always reliable. Therefore, the eNB 110 may filter the BLER of the UE 115 based upon adjustments to the MCS type and/or MIMO type that is scheduled for the UE 115 by the eNB 110. The BLER filtering of the outer loop 620 may be implemented in different manners. In a first example, the BLER filtering may be an infinite impulse response ("IIR") filtering of errors in a cyclic redundancy check ("CRC"). In a second example, the BLER filtering may be a block-wise moving average. Furthermore, one or more hystereses may usually be applied to the BLER targets when an average BLER changes to a degree sufficiently large enough to trigger the MCS adjustment.

The outer loop 620 scheduling may particularly relate to a scheduling adjustment such as a MCS to RB. The scheduling adjustment may also be based upon a filtered BLER. For example, in the LTE-RAN 105, the MCS that determines the coding rate where a higher MCS results in a higher coding rate may be adjusted based on the filtered BLER fluctuation. In addition, a step size of the MCS adjustment may also be of importance. To have a stable outer loop, the step size for the MCS to be adjusted upward is usually smaller compared to the step size for the MCS to be adjusted downward. This processing of the outer scheduling may result in the outer ACK, such as the ACK being included in a physical downlink shared channel ("PDSCH").

Accordingly, the outer loop 620 may be used by the UE 115 for providing the eNB 110 with PDSCH ACK information. Furthermore, the use of the outer loop 620 by the eNB 110 to adjust scheduling (e.g., MCS/RB/MIMO types) may be referred to as an outer loop link adaptation ("OLLA"). For instance, there may be a BLER target to be maintained by the eNB 110, wherein this BLER target may vary for different channel scenarios (e.g., such a Doppler dependency). Since the CSF estimation provided by the UE 115 may not be reliable, the eNB 110 may filter the UE BLER and adjust the MCS/MIMO type scheduled for the UE 115 based on this filtered BLER.

In regards to scheduling adjustments, such as within the LTE network 105, the MCS may be adjusted by the eNB 110 based on the filtered BLER fluctuation. Furthermore, the step size of the MCS adjustment may also be of significance. For instance, in order to have a stable outer loop 620, the step size for the MCS to be adjusted up may be smaller in comparison to the step size for the MCS to be adjusted down.

According to an exemplary carrier aggregation scenario, there may be two activated carriers and the UL-DL configuration may be presumed to be 2. Within such a TD-LTE DL CA scenarios, there are simply not enough bits available to fully represent the possibility of DL reception status (ACK/NACK/DTX) in the PUCCH. Accordingly, there are ambiguities of decoding PUCCH for obtaining the DL CRC status at the eNB 110. For example, the table 400 discussed above demonstrates that there are ambiguities shown in the form of designations of "NACK/DTX" or "any."

When handling such transmission of DL status information, the eNB 110 is unable to resolve the ambiguity of either "NACK/DTX" or "any." Specifically, the eNB 110 may take conservative approaches of interpreting DL CRC status and apply different considerations to those in the link adaptation outer loop 620 for updating the outer loop BLER filtering. For instance, the eNB 120 may consider the "NACK/DTX" designation as NACK and update the outer loop BLER filtering accordingly. The eNB 120 may consider the "any" designation as DTX and skip the updating of the outer loop BLER filter. Otherwise, the eNB 120 may introduce a vast change to the BLER filtering and impact the stability of the OLLA.

It should be noted that since the interpretation by the eNB 120 of decoded PUCCH information for DL CA may be conservative due to ambiguity, there may be issues of not being able to adapt the BLER outer loop if the eNB 120 initial set point over-schedules with higher MCSs. Accordingly, this may lead to high BLER, and thus, lower total throughput.

Specifically, as noted above, the eNB 120 may skip the update to the outer loop 620 when the decoded PUCCH information is designated with "any," and interpreted as a NACK at the eNB 120. This may lead to the OLLA not being able to adjust to achieve a proper BLER target. Conversely, if all of the "any" designations are considered by the eNB 120 to be NACK due to ambiguity, the BLER OLLA loop may be over-adjusted. Such over-adjustments may lead to large fluctuations of the OLLA, and thus increase the time and/or complexity of loop convergence.

Figure 7:
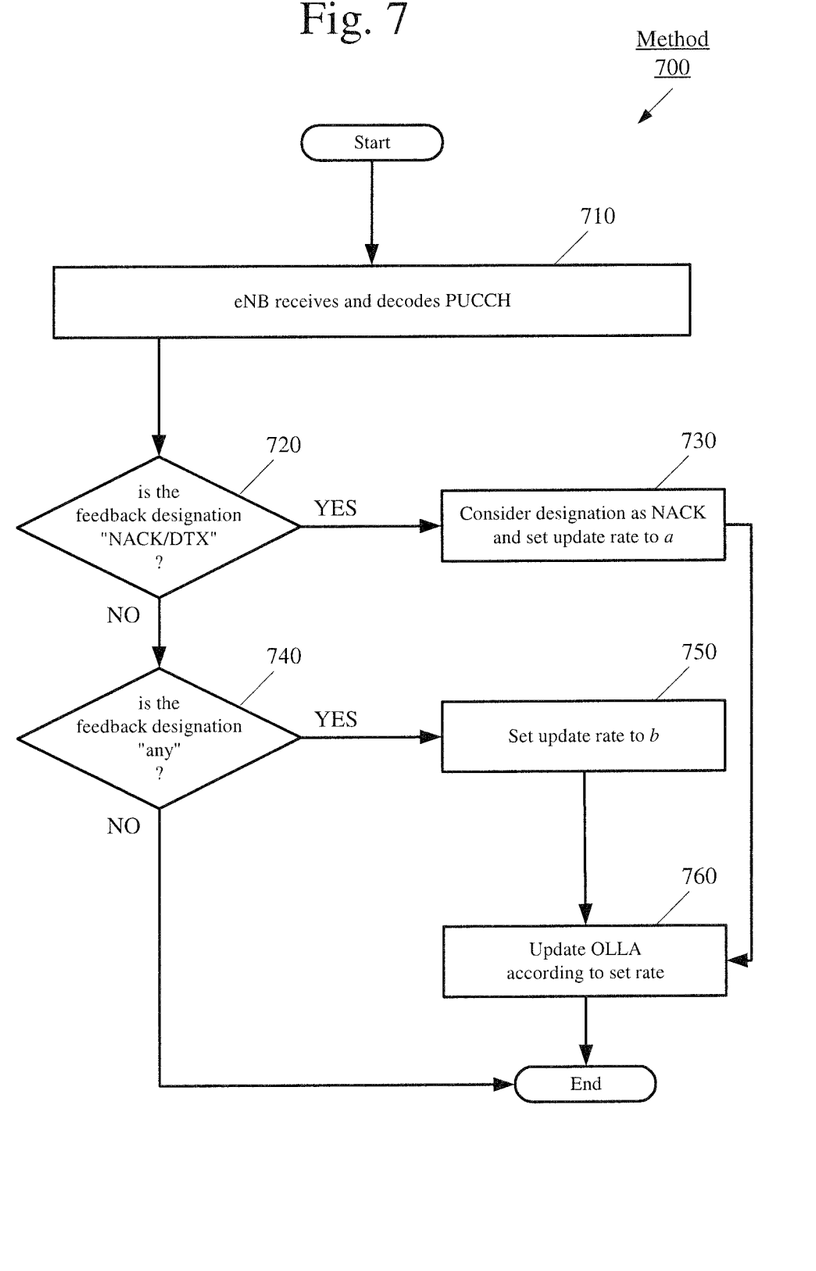
FIG. 7 shows an exemplary method for adaptive link adaptation at the outer loop according to various embodiments described herein.

FIG. 7 shows an exemplary method 700 for adaptive link adaptation at the outer loop 620 according to various embodiments described herein. The method 700 will be described with reference to the network arrangement 100 of FIG. 1 and system 600 of FIG. 6. According to the exemplary method 700, the eNB 110 may adaptively adjust a OLLA update rate based on the decoded PUCCH message in DL CA scenarios within the TD-LTE network 105.

In 710, the eNB 110 may receive and decode a PUCCH message. As detailed above and in table 400 of FIG. 4, the decoded message may provide the eNB 110 with transmission indicators for CRC status such as ACK, NACK, DTX, and any.

In 720, the eNB 110 may determine if the designation is "NACK/DTX." If the decoded CRC status is "NACK/DTX," in 730 the eNB 110 may consider the designation as NACK and set the OLLA loop update rate to a first rate (e.g., rate α). According to an exemplary embodiment, the rate α may have a value of 0<α<1. That is, while the eNB 110 cannot resolve the ambiguity, the eNB 110 is not required to assume the most conservative approach, e.g., the CRC status is a NACK and adjust the OLLA at the full rate. Rather, the eNB 110 assumes the CRC status to be a NACK, but sets the OLLA update rate at a value α, that is less than the full rate. In this way, as the eNB 110 receives the ambiguous NACK/DTX feedback, the eNB 110 is not limited to only adjusting the OLLA at the full rate or not adjusting the OLLA at all. The α value for the OLLA update rate allows the eNB 110 to essentially assume a certain number of the NACK/DTX are NACKS and the remaining are DTXs because the OLLA update rate is a partial update rate.

The value of α may be set according to various manners. For example, it may be possible to collect data from UEs in a particular environment (e.g., location) and determine the number of actual NACKs and DTXs that have been recorded. This data may then be used by an administrator of the eNB 110 to set the α value. In another example, the eNB 110 (or a series of eNBs) may measure the overall performance of the OLLA updates using various α values and then converge to an appropriate α value. Those skilled in the art will understand that there may be other manners of determining the α value. It should also be noted that the α value may be variable for the eNB 110 based on various factors such as, but not limited to, loading, SNR, time of day, etc.

Continuing with the method 700, if the decoded CRC status is not "NACK/DTX," in 740 the eNB 110 may determine if the designation is "any." If the decoded CRC status is "any," in 750 the eNB 110 may set the OLLA loop update rate to a second rate (e.g., rate β). According to an exemplary embodiment, the rate β may have a value of β<α. Since a feedback of "any" could be an ACK, NACK or DTX, the likelihood of a NACK is less than the likelihood of a NACK when the ambiguity is NACK/DTX. Thus, the value of β is set to a value that is less than α because there is a lower likelihood of the ambiguity actually being a NACK. That is, the values of α and β are set such that a higher value means a faster OLLA update. Since the NACK/DTX ambiguity (α value update rate) is more likely a NACK than the "any" ambiguity (β value update rate), the α value is normally set higher than the β value. However, this is not a requirement. Actual usage data may indicate circumstances where the β value is set higher than α value. The value of β may be set in a similar manner to the examples provided above for the value of α.

In 760, the eNB 110 may update the OLLA loop 620 based on the update rate set in 730 and 750. According an exemplary embodiment, the OLLA loop 620 may be updated based on a type of loop implementation, such as, but not limited to, an IIR BLER filtering loop, a sliding window loop, etc. Accordingly, if the loop 620 is implemented as an IIR BLER filtering loop, the filtering coefficients may be adjusted for adapting the rates. For example, a single-tap IIR may only have one coefficient to be adjusted. If the loop 620 is implemented as a sliding window, a lower rate may be achieved as a lower weight is placed on those CRC statuses while summing the weighted CRC feedback. It should be noted that if the eNB 110 definitively determines a NACK feedback, the eNB 110 may update the OLLA at the full rate.

The exemplary method 700 may provide improvements to the performance of the eNB 110 and the network 105. Specifically, with an adaptive OLLA loop update rate, it is possible to take NACKs from an "any" designation into consideration while maintaining loop stability. Therefore, an improved convergence rate of OLLA may be achieved, and thus, lead to higher system throughputs.

It may be noted that the exemplary embodiments are described with reference to the LTE wireless communication system. However, those skilled in the art will understand that the exemplary embodiments may be applied to any wireless communication schemes including those having different characteristics from the LTE scheme. For instance, the exemplary embodiments may be applied within any 3GPP network including LTE, Universal Mobile Telecommunications System ("UMTS"), etc.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
    at a base station connected to a user equipment ("UE"):
        determining an initial modulation and coding scheme ("MCS") for a plurality of subframes to be transmitted to the UE, wherein the initial MCS relates to a coding rate for the plurality of subframes;
        determining an MCS pattern for the plurality of subframes based on the initial MCS for the plurality of subframes, wherein the MCS pattern includes an MCS for each subframe of the plurality of subframes and wherein an MCS for at least one subframe of the plurality of subframes has a lower coding rate than the initial MCS;
        transmitting the plurality of subframes to the UE according to the MCS pattern for the plurality of subframes;
        receiving feedback from the UE in response to the plurality of subframes;
        determining that a type of the feedback is ambiguous feedback; and
        retransmitting only the at least one subframe of the plurality of subframes with the lower coding rate than the initial MCS based on the ambiguous feedback.

2. The method of claim 1, wherein the initial MCS is based on a signal-to-noise ratio ("SNR") value in a communication channel between the base station and the UE.

3. The method of claim 1, wherein the MCS pattern includes an MCS for at least one further subframe of the plurality of subframes having a coding rate that is higher than the coding rate of the initial MCS.

4. The method of claim 1, wherein the one subframe of the plurality of subframes is a first subframe of the plurality of subframes transmitted to the UE.

5. The method of claim 1, wherein the MCS pattern includes an MCS for at least one further subframe of the plurality of subframes having a coding rate that is lower than the coding rate for the initial MCS.

6. The method of claim 1, wherein the MCS pattern includes an MCS for at least one further subframe of the plurality of subframes having a coding rate that is equal to the coding rate for the initial MCS.

7. The method of claim 1, wherein the transmitting of the plurality of subframes to the UE includes multiplexing an acknowledgment and negative acknowledgment ("ACK/NACK") reporting set.

8. The method of claim 1, wherein determining that the type of feedback is ambiguous feedback is based on mapping payload data included in the feedback to different interpretations of an ACK/NACK status.

9. An evolved Node B ("eNB"), comprising:
a transceiver configured to enable the eNB to establish a connected to a user equipment ("UE") within a Long Term Evolution (LTE) network; and
a processor configured to:
determine an initial modulation and coding scheme ("MCS") for a plurality of subframes to be transmitted to the UE, wherein the initial MCS relates to a coding rate for the plurality of subframes,
determine an MCS pattern for the plurality of subframes based on the initial MCS for the plurality of subframes, wherein the MCS pattern includes an MCS for each subframe of the plurality of subframes and wherein an MCS for at least one subframe of the plurality of subframes has a lower coding rate than the initial MCS,
transmit the plurality of subframes to the UE according to the MCS pattern for the plurality of subframes
receiving feedback from the UE in response to the plurality of subframes,
determining that a type of the feedback is ambiguous feedback, and
retransmitting only the at least one subframe of the plurality of subframes with the lower coding rate than the initial MCS based on the ambiguous feedback.

10. The eNB of claim 9, wherein the initial MCS is based on a signal-to-noise ratio ("SNR") value in a communication channel between the base station and the UE.

11. The eNB of claim 9, wherein the MCS pattern includes an MCS for at least one further subframe of the plurality of subframes having a coding rate that is higher than a coding rate of the initial MCS.

12. The eNB of claim 9, wherein the one subframe of the plurality of subframes is a first subframe of the plurality of sub frames transmitted to the UE.

13. The eNB of claim 9, wherein the MCS pattern includes an MCS for at least one further subframe of the plurality of subframes having a coding rate that is lower than the coding rate for the initial MCS.

14. The eNB of claim 9, wherein the MCS pattern includes an MCS for at least one further subframe of the plurality of subframes having a coding rate that is equal to the coding rate of the initial MCS.

15. The eNB of claim 9, wherein the transmitting of the plurality of subframes to the UE includes multiplexing an acknowledgment and negative acknowledgment ("ACK/NACK") reporting set.

16. An integrated circuit configured to execute instructions, wherein execution of the instructions causes the integrate circuit to perform operations, comprising:
determining an initial modulation and coding scheme ("MCS") for a plurality of subframes to be transmitted to a UE, wherein the initial MCS relates to a coding rate for the plurality of subframes;
determining an MCS pattern for the plurality of subframes based on the initial MCS, wherein the MCS pattern includes an MCS for each subframe of the plurality of subframes and wherein an MCS for at least one subframe of the plurality of subframes has a lower coding rate than the initial MCS;
preparing the plurality of subframes to be transmitted to the UE according to the MCS pattern;
receiving feedback from the UE in response to the plurality of subframes;
determining that a type of the feedback is ambiguous feedback; and
retransmitting only the at least one subframe of the plurality of subframes with lower coding rate than the initial MCS based on the ambiguous feedback.

17. The integrated circuit of claim 16, wherein the initial MCS is based on a signal-to-noise ratio ("SNR") value in a communication channel between a base station and the UE.

18. The integrated circuit of claim 16, wherein the MCS pattern includes an MCS for at least one further subframe of the plurality of subframes having a coding rate that is higher than the coding rate of the initial MCS.

19. The integrated circuit of claim 16, wherein the one subframe of the plurality of subframes is a first subframe of the plurality of subframes to be transmitted to the UE.

20. The integrated circuit of claim 16, wherein the MCS pattern includes an MCS for at least one further subframe of the plurality of subframes having a coding rate clue that is one of lower than the coding rate of the initial MCS or equal to the coding rate of the initial MCS.

* * * * *

UNITED STATES PATENT AND TRADEMARK OFFICE
CERTIFICATE OF CORRECTION

PATENT NO. : 10,728,903 B2
APPLICATION NO. : 15/128264
DATED : July 28, 2020
INVENTOR(S) : Ji et al.

Page 1 of 1

It is certified that error appears in the above-identified patent and that said Letters Patent is hereby corrected as shown below:

In the Claims

Claim 12, Column 13, Lines 38:
"sub frames transmitted to the UE."
Should read:
"subframes transmitted to the UE."

Claim 20, Column 14, Line 41:
"the plurality of subframes having a coding rate clue that is"
Should read:
"the plurality of subframes having a coding rate that is"

Signed and Sealed this
Twenty-second Day of September, 2020

Andrei Iancu
*Director of the United States Patent and Trademark Office*